(12) United States Patent
Teicher

(10) Patent No.: US 10,025,471 B1
(45) Date of Patent: Jul. 17, 2018

(54) USER-PROGRAMMABLE CLUSTER OF SMART DEVICES

(71) Applicant: Mordechai Teicher, Hod-Hasharon (IL)

(72) Inventor: Mordechai Teicher, Hod-Hasharon (IL)

(*) Notice: Subject to any disclaimer, the term of this patent is extended or adjusted under 35 U.S.C. 154(b) by 0 days.

(21) Appl. No.: 15/806,357

(22) Filed: Nov. 8, 2017

Related U.S. Application Data

(60) Provisional application No. 62/575,432, filed on Oct. 21, 2017.

(51) Int. Cl.
  *G06F 15/00* (2006.01)
  *G06F 13/00* (2006.01)
  *G06F 3/0484* (2013.01)
  *G06F 17/24* (2006.01)

(52) U.S. Cl.
  CPC .......... *G06F 3/0484* (2013.01); *G06F 17/246* (2013.01)

(58) Field of Classification Search
  CPC ................................................ G06F 17/30563
  USPC ........................................ 715/740, 763, 765
  See application file for complete search history.

(56) References Cited

U.S. PATENT DOCUMENTS

| | | | |
|---|---|---|---|
| 2003/0050737 A1 | 3/2003 | Osann | |
| 2005/0096753 A1 | 5/2005 | Arling et al. | |
| 2010/0082537 A1* | 4/2010 | Lasser .................. | G06F 3/0608 707/610 |
| 2011/0211584 A1 | 9/2011 | Mahmoud | |
| 2011/0295904 A1* | 12/2011 | Mohan .................. | G06F 17/246 707/802 |
| 2013/0245796 A1 | 9/2013 | Lentzitzky et al. | |
| 2014/0064738 A1 | 3/2014 | Chen et al. | |
| 2014/0066062 A1 | 3/2014 | Chen et al. | |
| 2014/0098247 A1 | 4/2014 | Rao et al. | |
| 2014/0108019 A1 | 4/2014 | Ehsani et al. | |
| 2014/0244001 A1 | 8/2014 | Glickfield et al. | |
| 2014/0369231 A1 | 12/2014 | Chen et al. | |
| 2015/0100173 A1 | 4/2015 | Tubi et al. | |
| 2016/0182247 A1 | 6/2016 | Cregg | |
| 2016/0183030 A1 | 6/2016 | Cregg | |
| 2016/0249286 A1 | 8/2016 | Chen | |
| 2016/0284206 A1 | 9/2016 | Boettcher et al. | |
| 2016/0292240 A1* | 10/2016 | Diwan .............. | G06F 17/30563 |
| 2016/0364114 A1 | 12/2016 | Von Dehsen et al. | |
| 2017/0026195 A1 | 1/2017 | Pan | |

OTHER PUBLICATIONS

Apple Inc., HomeKit Accessory Protocol Specification (Non-Commercial Version), Release R1, Jun. 7, 2017.

* cited by examiner

*Primary Examiner* — Kevin Nguyen

(57) ABSTRACT

Cooperation among functional units of a cluster of smart devices is programmed by a user using a spreadsheet. The user authors spreadsheet formulas to calculate target states of active units of the cluster according to the contents of spreadsheet cells that include current states of functional units of the cluster. Programming messages based on the spreadsheet formulas are received by the smart devices of the cluster and program those smart devices for autonomous operation. Processors of the smart devices then receive updated current states of functional units of the cluster, calculate the target states of the active units according to the received updated current states, and control the active units toward reaching their calculated target states.

15 Claims, 16 Drawing Sheets

|   | A | B | C | D | E |
|---|---|---|---|---|---|
| 1 | Vendor | V | V | V | V |
| 2 | Device | V | V | V | V |
| 3 | Functional unit | V | V | V | V |
| 4 | Functional unit ID | V | V | V | V |
| 5 | Type | V | V | V | V |
| 6 | Health | D | D | D | D |
| 7 | User-given name | U | U | U | U |
| 8 | State format | V/U | V(U) | V(U) | V(U) |
| 9 | Min value | V | V | V | V |
| 10 | Max value | V | V | V | V |
| 11 | Step | V | V | V | V |
| 12 | Legend | V | V | V | V |
| 13 | Default state | V/U | V/U | V/U | V/U |
| 14 | Current state | U/D | U/D | U/D | U/D |
| 15 | Time of last change | U/D | U/D | U/D | U/D |
| 16 | Target state calc | (U) | (U) | (U) | (U) |
| 17 | Current time | U/D | | | |
| 18 | | U | U | U | U |
| 19 | | U | U | U | U |
| 20 | | U | U | U | U |
| 21 | | U | U | U | U |
| 22 | | U | U | U | U |
| 23 | | U | U | U | U |
| 24 | | U | U | U | U |
| 25 | | U | U | U | U |

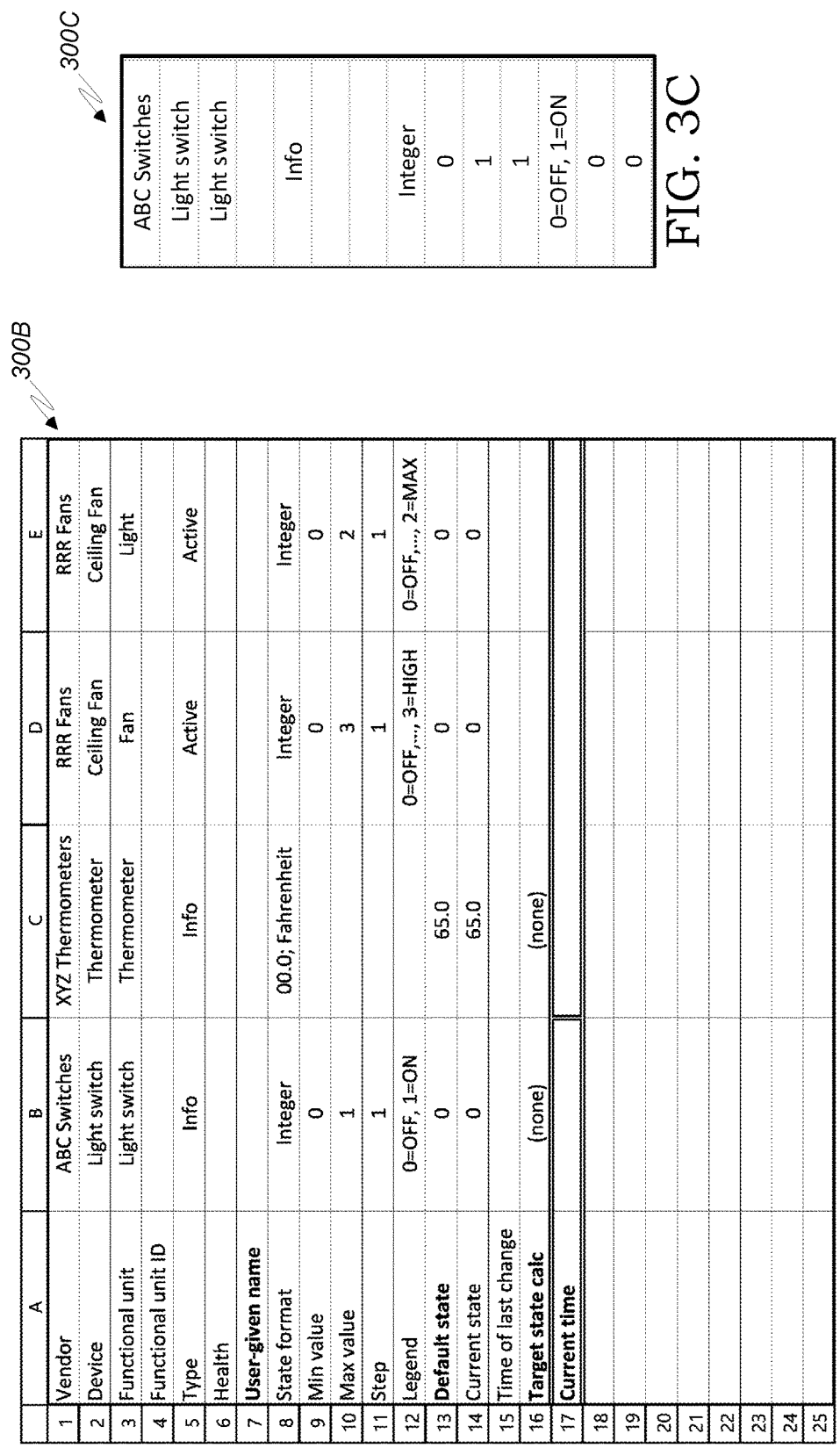

|  | A | B | C | D | E |
|---|---|---|---|---|---|
| 1 | Vendor | ABC Switches | XYZ Thermometers | RRR Fans | RRR Fans |
| 2 | Device |  | Thermometer | Ceiling Fan | Ceiling Fan |
| 3 | Functional unit | Light switch | Thermometer | Fan | Light |
| 4 | Functional unit ID | Light switch |  |  |  |
| 5 | Type | Info | Info | Active | Active |
| 6 | Health | OK | OK | OK | OK |
| 7 | User-given name | Living room switch | Living room temp | Living room light | Living room fan |
| 8 | State format | Integer | 00.0; Fahrenheit | Integer | Integer |
| 9 | Min value | 0 | 0 | 0 | 0 |
| 10 | Max value | 1 | 3 | 3 | 2 |
| 11 | Step | 1 | 1 | 1 | 1 |
| 12 | Legend | 0=OFF, 1=ON |  | 0=OFF,..., 3=HIGH | 0=OFF,..., 2=MAX |
| 13 | Default state | 0 | 65 | 0 | 0 |
| 14 | Current state | 1 | 80 | 0 | 0 |
| 15 | Time of last change | 2017-10-17 8:30:00 | 2017-10-17 9:30:00 | 2017-10-17 8:00:00 | 2017-10-17 10:30:00 |
| 16 | Target state calc | (none) | (none) | =IF(E16=0,0,(IF(C14<=68,0,(IF(C14<=75,1,(IF(C14<=80,2,3)))))) | =IF(B14=0,0,B20) |
| 17 | Current time | =NOW() |  |  |  |
| 18 |  |  |  |  |  |
| 19 | Current hour: | =HOUR(B17) |  |  |  |
| 20 | Light by the hour: | =IF(AND(B19>B22,B19<B23),1,2) |  |  |  |
| 21 |  |  |  |  |  |
| 22 | Sunrise hour: | 6 |  |  |  |
| 23 | Sunset hour: | 19 |  |  |  |
| 24 |  |  |  |  |  |
| 25 |  |  |  |  |  |

FIG. 3D

|   | A | B | C | D | E |
|---|---|---|---|---|---|
| 1 | Vendor | ABC Switches | XYZ Thermometers | RRR Fans | RRR Fans |
| 2 | Device | Light switch | Thermometer | Ceiling Fan | Ceiling Fan |
| 3 | Functional unit | Light switch | Thermometer | Fan | Light |
| 4 | Functional unit ID | | | | |
| 5 | Type | Info | Info | Active | Active |
| 6 | Health | OK | OK | OK | OK |
| 7 | User-given name | Living room switch | Living room temp | Living room light | Living room fan |
| 8 | State format | Integer | 00.0; Fahrenheit | Integer | Integer |
| 9 | Min value | 0 | | 0 | 0 |
| 10 | Max value | 1 | | 3 | 2 |
| 11 | Step | 1 | | 1 | 1 |
| 12 | Legend | 0=OFF, 1=ON | | 0=OFF,..., 3=HIGH | 0=OFF,..., 2=MAX |
| 13 | Default state | 0 | 65.0 | 0 | 0 |
| 14 | Current state | 1 | 80.0 | 0 | 0 |
| 15 | Time of last change | 2017-10-17 8:30:00 | 2017-10-17 9:30:00 | 2017-10-17 8:00:00 | 2017-10-17 10:30:00 |
| 16 | Target state calc | (none) | (none) | 2 | 1 |
| 17 | Current time | 2017-10-17 11:15:00 | | | |
| 18 | | | | | |
| 19 | Current hour: | 11 | | | |
| 20 | Light by the hour: | 1 | | | |
| 21 | | | | | |
| 22 | Sunrise hour: | 6 | | | |
| 23 | Sunset hour: | 19 | | | |
| 24 | | | | | |
| 25 | | | | | |

| | A | B | C | D | E |
|---|---|---|---|---|---|
| 1 | Vendor | ABC Switches | XYZ Thermometers | RRR Fans | RRR Fans |
| 2 | Device | Light switch | Thermometer | Ceiling Fan | Ceiling Fan |
| 3 | Functional unit | Light switch | Thermometer | Fan | Light |
| 4 | Functional unit ID | 543999770 | 362907445 | 838484724F | 838484724L |
| 5 | Type | Info | Info | Active | Active |
| 6 | Health | (as recorded) | (as recorded) | (as recorded) | (as recorded) |
| 7 | User-given name | Living room switch | Living room temp | Living room light | Living room fan |
| 8 | State format | Integer | 00.0; Fahrenheit | Integer | Integer |
| 9 | Min value | 0 | | 0 | 0 |
| 10 | Max value | 1 | | 3 | 2 |
| 11 | Step | 1 | | 1 | 1 |
| 12 | Legend | 0=OFF, 1=ON | | 0=OFF,..., 3=HIGH | 0=OFF,..., 2=MAX |
| 13 | Default state | 0 | 65 | 0 | 0 |
| 14 | Current state | (as recorded) | (as recorded) | (as recorded) | (as recorded) |
| 15 | Time of last change | (as recorded) | (as recorded) | (as recorded) | (as recorded) |
| 16 | Target state calc | (none) | (none) | =IF(E16=0,0,(IF(C14<=68,0,(IF(C14<=75,1,(IF(C14<=80,2,3)))))) | =IF(B14=0,0,B20) |
| 17 | Current time | =NOW() | | | |
| 18 | | | | | |
| 19 | Current hour: | =HOUR(B17) | | | |
| 20 | Light by the hour: | =IF(AND(B19>B22,B19<B23),1,2) | | | |
| 21 | | | | | |
| 22 | Sunrise hour: | 6 | | | |
| 23 | Sunset hour: | 19 | | | |
| 24 | | | | | |
| 25 | | | | | |

```
Vendor,ABC Switches,XYZ Thermometers,RRR Fans,RRR Fans,,,
Device,Light switch,Thermometer,Ceiling Fan,Ceiling Fan,,,
Functional unit,Light switch,Thermometer,Fan,Light,,,,
Functional unit ID,543999770,362907445,838484724F,838484724L,,,
Type,Info,Info,Active,Active,,,
Health,,,,,,,
User-given name,Living room switch,Living room temp,Living room light,Living room fan,,,
State format,Integer,00.0; Fahrenheit,Integer,Integer,,,
Min value,0,,0,0,,,
Max value,1,,3,2,,,
Step,1,,1,1,,,
Legend,"0=OFF, 1=ON",,"0=OFF,, 3=HIGH","0=OFF,, 2=MAX",,,
Default state,0,65,0,0,,,
Current state,,,,,,,
Time of last change,,,,,,
Target state calc,(none),(none),"=IF(E16=0,0,(IF(C14<=68,0,(IF(C14<=75,1,(IF(C14<=80,2,3))))))))","=IF(B14=0,0,B20)",,,
Current time,=NOW(),,,,,, ,,,,,,
Current hour:,=HOUR(B17),,,,,
Light by the hour:,"=IF(AND(B19>B22,B19<B23),1,2)",,,,,, ,,,,,,
Sunrise hour:,6,,,,,
Sunset hour:,19,,,,,
,,,,,,
,,,,,,
```

FIG. 3G

```
Vendor,Device,Functional unit,Functional unit ID,Type,Health,User-given
name,State format,Min value,Max value,Step,Legend,Default state,Current
state,Time of last change,Target state calc,Current time,,Current hour:,Light
by the hour:,Sunrise hour:,Sunset hour:

ABC Switches,Light switch,Light switch,543999770,Info,(as recorded),Living room
switch,Integer,0,1,1,"0=OFF, 1=ON",0,(as recorded),(as
recorded),(none),,=NOW(),,=HOUR(Q2),"=IF(AND(S2>V2,S2<W2),1,2)",,6,19

XYZ Thermometers,Thermometer,Thermometer,362907445,Info,(as recorded),Living
room temp,00.0; Fahrenheit,,,,,65,(as recorded),(as recorded),(none),,,,,,, RRR Fans,Ceiling Fan,Fan,838484724F,Active,(as recorded),Living room
light,Integer,0,3,1,"0=OFF,?, 3=HIGH",0,(as recorded),(as
recorded),"=IF(P5=0,0,(IF(N3<=68,0,(IF(N3<=75,1,(IF(N3<=80,2,3)))))))",,,,,,, RRR Fans,Ceiling Fan,Light,838484724L,Active,(as recorded),Living room
fan,Integer,0,2,1,"0=OFF,?, 2=MAX",0,(as recorded),(as
recorded),"=IF(N2=0,0,T2)",,,,,,,
```

FIG. 3H

,,,,,,,
,,,,,,,
,543999770,362907445,8384484724F,8384484724L,,,
,,,,,,
,,,,,,,
,,,,,,,
,,,,,,,
,0,65,0,0,,,,
,,,,,,,
,"=IF(E16=0,0,(IF(C14<=68,0,(IF(C14<=75,1,(IF(C14<=80,2,3))))))","=IF(B14=0,0,B20)",,,
,=NOW(),,,,,,
,,,,,,,
,=HOUR(B17),,,,,,
,"=IF(AND(B19>B22,B19<B23),1,2)",,,,,,
,,,,,,,
,6,,,,,
,19,,,,,
,,,,,,,
,,,,,,,

FIG. 3J

USER-PROGRAMMABLE CLUSTER OF SMART DEVICES

REFERENCE TO RELATED APPLICATIONS

This application claims the benefit of U.S. provisional patent application 62/575,432 filed on 21 Oct. 2017, which is incorporated by reference as if set forth herein.

BACKGROUND OF THE INVENTION

Field of the Invention

The present invention relates to smart devices, and in particular to cooperation among smart devices.

Description of Related Art

The Internet of things (IoT) is a network of physical devices embedded with electronics, software, sensors, actuators, and network connectivity which enable these devices to collect and exchange data and perform actions. The smart home, also known as home automation or domotics, is a subset of IoT, focusing on the control and automation of residential lighting, heating, ventilation, air conditioning, security, appliances and gadgets.

Presently, while one can easily switch-on his living room lights from the other side of the city or the world, and get anywhere a message from his alarm system whenever the front door opens, he will have a hard time, and may need to hire a programmer or a technician, for having the living room light automatically switch on as the front door opens, if such cooperation has not been preprogrammed into a smart home hub that controls the devices.

There is thus a need for systems and functionalities that facilitate the programming of cooperation among smart devices, so that even users that are not programmers or technicians can set up smart devices to communicate and cooperate according to the users' requirements and preferences.

BRIEF SUMMARY OF THE INVENTION

The present invention seeks to provide systems and functionalities that facilitate the programming of cooperation among smart devices, so that even users that are not programmers or technicians can set up smart devices to cooperate according to the users' requirements and preferences. The level of skill required for setting up smart devices according to the present invention is that of spreadsheet users, where more experienced and capable spreadsheet users turn into more sophisticated users of the present invention.

A "smart device" herein is a physical thing that includes at least one "functional unit" that is either an "information unit" that measures, collects, detects, downloads or otherwise obtains useful information, or an "active unit" that controllably performs an action. Smart devices communicate with other devices via communication links such as Bluetooth LE, Wi-Fi, infrared, sound, wired connection, powerline connection, text messaging, or any other technology that may move data among devices. An "active smart device", abbreviated "active device", is a smart device that includes at least one active unit. An "information smart device", abbreviated "information device", is a smart device that includes no active unit, while including one or more information units.

A smart device may include several functional units embodied as distinct hardware pieces, such as a ceiling fan that includes both a fan unit and a lighting unit, while a single hardware piece may serve as multiple functional units, for example, a camera that serves as both a license plate reader and a motion detector.

Each functional unit has a "state" parameter that measures or characterizes the condition or output of the functional unit. Non-limiting examples are numeric states in case of a temperature sensor; textual states, such as {"off", "low", "med", "high"}, in case of an air conditioner; or an alphanumeric expression in the case of a license plate reader. A "current state" of a functional unit is the current condition or output of a functional unit, while a "target state" of an active unit is a state to be reached by the active unit.

An active unit "cooperates" with another (active or information) functional unit if the active unit changes its state in response to a change in the state of the other functional unit. The two cooperating functional units may reside on two separate smart devices, for example one smart device controlling an air conditioner while the other smart device including an ambient thermometer; or both may reside within a single smart device, as is the case, for example, of a smart device that includes both a light (active unit) and a motion sensor (information unit) that affects the operation of the light.

It will be noted that cooperation may be extended beyond two smart devices or functional units. For example, a light (active unit) may turn on when both darkness is detected by a light sensor (information unit) while motion is detected by a motion sensor (information unit); further, the same light (active unit) may turn on also upon an electric gate (active unit) opens while darkness is detected by the light sensor (information unit).

A "user" is a person setting up a plurality of smart devices to cooperate according to the user's requirements and preferences.

A "cluster" is a group of at least two smart devices, each selected by a user for cooperating with at least one other smart device of the cluster. A functional unit is said to belong to a cluster if it forms part of a smart device included in the cluster. A cluster selectably cooperates with at least one "programming device" that is a computing device, such as a personal computer, a tablet or a smartphone, that can communicate with smart devices of the cluster in for allowing the user to conveniently program the cluster. Preferably but not necessarily, the programming device is disconnected from the cluster when the cluster programming is completed.

A "spreadsheet" is used herein under two meanings: (1) data and formulas organized in a tabular form; and (2) an interactive computer program for organization, analysis and storage of data in tabular form. The program operates on data entered in cells of a table. Each cell may contain numeric data, logical data, text data or a formula, and display the data or the result of calculating the formula based on the contents of other cells. For brevity, "cell" herein may mean also to the content of a cell, as in the expression cell A7 equals cell B5 plus cell C6. A "spreadsheet formula" is a spreadsheet-recognizable formula originally entered by a user into a cell of a spreadsheet, in a form that is a human-comprehensible textual expression that may include any combination of: numeric, logical and/or text values; references to other cells; arithmetic and/or relational operators; or functions.

The present disclosure recites processors performing calculations and controlling operations. The term "processor"

pertains herein to one or more microprocessors and/or circuits collectively programmed to perform an algorithm. The term "programmed to" or "programmed for" pertains herein to a processor configured to perform an algorithm by mask design, by executable code recorded in firmware embedded in or next to the processor, and/or by executable code loaded into the processor from a memory or another storage device.

The present disclosure focuses on the programming of functional cooperation among functional units of a cluster of smart devices, and does not concern communication and pairing among smart devices, which may benefit from popular communications protocol used for interconnecting products in smart homes, such as X10, Ethernet, RS-485, 6LoWPAN, Bluetooth LE (BLE), ZigBee and Z-Wave, with more new protocols emerging from time to time.

In its broadest sense, the present invention teaches cooperation among functional units of a cluster of smart devices that is programmed by a user using a spreadsheet. The user authors spreadsheet formulas to calculate target states of active units of the cluster according to the contents of spreadsheet cells that include current states of functional units of the cluster. Programming messages based on the spreadsheet formulas are received by the smart devices of the cluster and program those smart devices for autonomous operation. Processors of the smart devices then receive updated current states of functional units of the cluster, calculate the target states of the active units according to the received updated current states, and control the active units toward reaching their calculated target states.

According to preferred embodiments included in the present disclosure, there is provided a user-programmable system that includes a cluster of a plurality of smart devices, each smart device including: at least one functional unit, each functional unit having a current state of the functional unit, and a communication unit for communicating with other devices and for sending to other smart devices of the cluster updates on the current state of each functional unit of the smart device. At least one of the plurality of smart devices is an active device that includes a functional unit that is an active unit that performs an action, each active unit having a target state of the active unit. The user-programmable system further includes a user-operable programming device which includes: a communication unit for selectably (for example, upon user initiative or as technically needed) communicating with smart devices of the cluster, a memory for storing a cluster spreadsheet, the cluster spreadsheet including: (i) a plurality of current state cells, each current state cell corresponding to a functional unit of the cluster and storing a current state of the functional unit, and (ii) at least one formula cell, each formula cell corresponding to an active unit of the cluster and storing a spreadsheet formula authored by a user for calculating the target state of the active unit according to one or more cells of the spreadsheet. The programming device further includes a user interface for enabling viewing and modifying the cluster spreadsheet by users, and a processor programmed to: (i) run a spreadsheet program for receiving from the user, via the user interface, spreadsheet formulas for formula cells, and (ii) send a programming message to an active device of the cluster, the programming message including instructions for calculating, by a processor of the active device, the target state of an active unit included in the active device, according to the spreadsheet formula corresponding to the active unit. An active device of the cluster, that includes an active unit, further includes a memory of the active device, and a processor programmed to: (i) receive a programming message from a programming device, the programming message including instructions for calculating a target state of the active unit according to one or more spreadsheet formulas, (ii) store instructions from the programming message in the memory of the active device, (iii) receive one or more current states of one or more functional units of the cluster, (iv) execute the instructions stored in the memory of the active device for calculating the target state of the active unit according to one or more received current states, and (v) control the active unit for reaching the target state.

In the user-programmable system above, the processor of the programming device may be further programmed to run the spreadsheet program in a cluster simulation mode, which includes receiving from the user, via the user interface, user-selected values for current state cells, calculating target states, and displaying the calculated target states. Furthermore, a programming message received by the active device from the programming device may include text from at least one spreadsheet formula, and the processor of the active device is programmed to interpret text of spreadsheet formulas to calculate target states according to the text.

Also, in the user-programmable system above, the cluster may include at least one smart device that includes a real-time clock, and at least one spreadsheet formula may include a time parameter. Also, the cluster spreadsheet may include a scratchpad area that includes one or more spreadsheet formulas authored by a user for performing intermediate calculations, and the calculation of a target state by the processor of the active device may be affected by the intermediate calculations. Furthermore, the programming message received by the processor of the active device from the processor of the programming device may be in the form of a device spreadsheet that includes all or part of the cluster spreadsheet, the current states received by the processor of the active device may be entered by the processor of the active device into corresponding cells of the device spreadsheet, and the calculation of the target state may be done by the processor of the active device executing a spreadsheet program for interpreting the device spreadsheet. The device spreadsheet received from the processor of the programming device may be in a textual format, such as CSV or tab-delimited text.

There is also provided an active device that forms part of a cluster of smart devices, each smart device of the cluster including at least one functional unit having a current state of the functional unit, the cluster programmed by a user using a programming device for entering spreadsheet formulas into a cluster spreadsheet for calculating target states of active units according to current states of functional units, the active device including: an active unit for performing an action and a communication unit for receiving from a programming device a device spreadsheet that includes at least part of the cluster spreadsheet, and for receiving from smart devices of the cluster current states of functional units of the cluster. The active device further includes a memory for storing the received device spreadsheet and storing the received current states of functional units of the cluster within corresponding current state cells of the device spreadsheet. The active device also includes a processor programmed to interpret the device spreadsheet for calculating a target state of the active unit according to at least one current state of a functional unit, and control the active unit for reaching the calculated target state.

In the active device above, the device spreadsheet may include at least one spreadsheet formula entered by a user for an intermediate calculation, and the calculation of the target state may be affected by the intermediate calculation. Also, the active device may include a real-time clock, and the device spreadsheet may include at least one spreadsheet formula that includes a time parameter. Furthermore, the device spreadsheet may equal the cluster spreadsheet, and the processor of the active device may be further programmed to provide the device spreadsheet to a programming device. Alternatively, the device spreadsheet may include less content than the cluster spreadsheet, and the memory of the device spreadsheet may also store a copy of the cluster spreadsheet.

There is also provided a method of operation of an active device that includes an active unit, the active device forming part of a cluster of a plurality of smart devices, the method including the steps of: receiving from a user, via a programming device, at least one spreadsheet formula corresponding to the active unit; receiving from each of at least one smart device of the cluster, a current state of at least one functional unit included in the smart device; interpreting the at least one spreadsheet formula for calculating a target state of the active unit according to at least one received current state of a functional unit; and operating the active unit for reaching the calculated target state. At least one spreadsheet formula may include a formula for an intermediate calculation and/or included to a time parameter.

Also provided is a cluster of smart devices cooperating according to a cluster spreadsheet that includes spreadsheet formulas, the cluster including: at least one information device, each information device including at least one information unit, each information unit having a current state; and at least one active device, each active device including: at least one active unit, each active unit having a current state and a target state, a memory storing at least one spreadsheet formula from the cluster spreadsheet, a communication unit for receiving current states from other smart devices of the cluster, and a processor programmed to: (i) execute one or more spreadsheet formulas stored in the memory for calculating the target state of an active unit included in the active device according to the current state of at least one information unit or active unit (other than the current active unit) of the cluster, and (ii) control the active unit for reaching the target state.

In the above cluster, the cluster spreadsheet and the memory of an active device may include a formula for an intermediate calculation. Also, at least one device of the cluster may include a real-time clock, and a spreadsheet formula may include a time parameter. Also, the cluster may include a plurality of active units, the at least one spreadsheet formula stored in the memory of an active unit may form part of a device spreadsheet, and all device spreadsheets of all active units of the cluster may include the same spreadsheet formulas.

In this disclosure and the attached claims, phrases such as "comprising an item", "including an item", "having an item", and so forth, denote one or more of the cited item. Also, depending on the context, phrases using a plural language such as in "the system includes widgets connected to gadgets" cover also the singular cases of a widget connected to a gadget, a widget connected to several gadgets, or several widgets connected to a gadget.

BRIEF DESCRIPTION OF THE DRAWINGS

The present invention will be understood and appreciated more fully from the following detailed description, taken in conjunction with the drawings in which:

FIGS. 3A-3H and 3J are sample spreadsheets demonstrating different contents and formats of cluster spreadsheets and device spreadsheets. "FIG. 3I" has been skipped to avoid confusion with "FIG. 31".

DETAILED DESCRIPTION

Cluster, Smart Devices and Functional Units

Figure 1A:
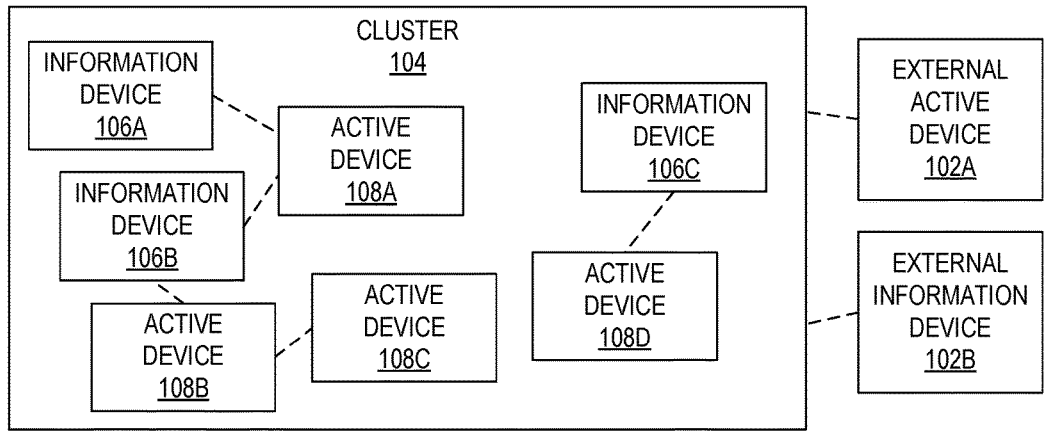
FIGS. 1A-1B are simplified block diagrams describing a cluster.

Reference is made to FIG. 1A that schematically describes a cluster 104 of smart devices. A cluster is established and programmed by a user, and may later be updated by revised programming and/or by adding, deleting or replacing smart devices. Exemplary cluster 104 includes seven smart devices, out of which devices 106A-106C are information devices while devices 108A-108D are active devices. Information devices provide information that may affect the operation of active devices, while active devices perform useful actions that serve a user. Preferably but not necessarily, smart devices include real-time clocks that may further affect their operation. In the example of FIG. 1A, information device 106A such as a hygrometer, and information device 106B such as an ambient thermometer, affect the operation of active device 108A such as an air conditioner in the living room. The room temperature measured by information device 106B also affects the operation of active device 108B such as electric shades, which in turn affects the operation of active device 108C such as the living room lights. Information device 106C, such as a motion sensor in the kitchen, affects the operation of active device 108D, such as the kitchen lights. It will be appreciated that the pair information device 106C and active device 108D could be separated into a separate cluster, but, at the user option, they are included in cluster 104. It will be also noted that the connections by dotted lines among smart devices in cluster 104 of FIG. 1A pertain only to cooperation among the devices. There are other layers of connections, that pertain to network communication, pairing, energy supply and management and security, that are covered by the art of smart homes and IoT and are out of the scope of the present disclosure. Generally speaking, all smart devices of a cluster are presumed to selectably or regularly communicate with one another, which allows a user to reprogram the cluster, or establish new cooperation among currently-unrelated smart devices of the cluster.

All smart devices of cluster 104 are configured to operate and cooperate according to the teachings of the present disclosure. There may be other devices, that are unaware of the present disclosure, but are still cooperating with smart devices of cluster 104. For example, an external active device 102A, such as a television, may be controlled by an infrared remote control that is a smart device of cluster 104, while an Internet weather forecast station that serves as external information device 102B, may be consulted by a data fetcher that serves as a smart device of cluster 104. Another example for an external device is a sophisticated home climate control system that operates independently of a cluster yet is set to send current states of its temperature and motion sensors to the cluster's devices.

Figure 1B:
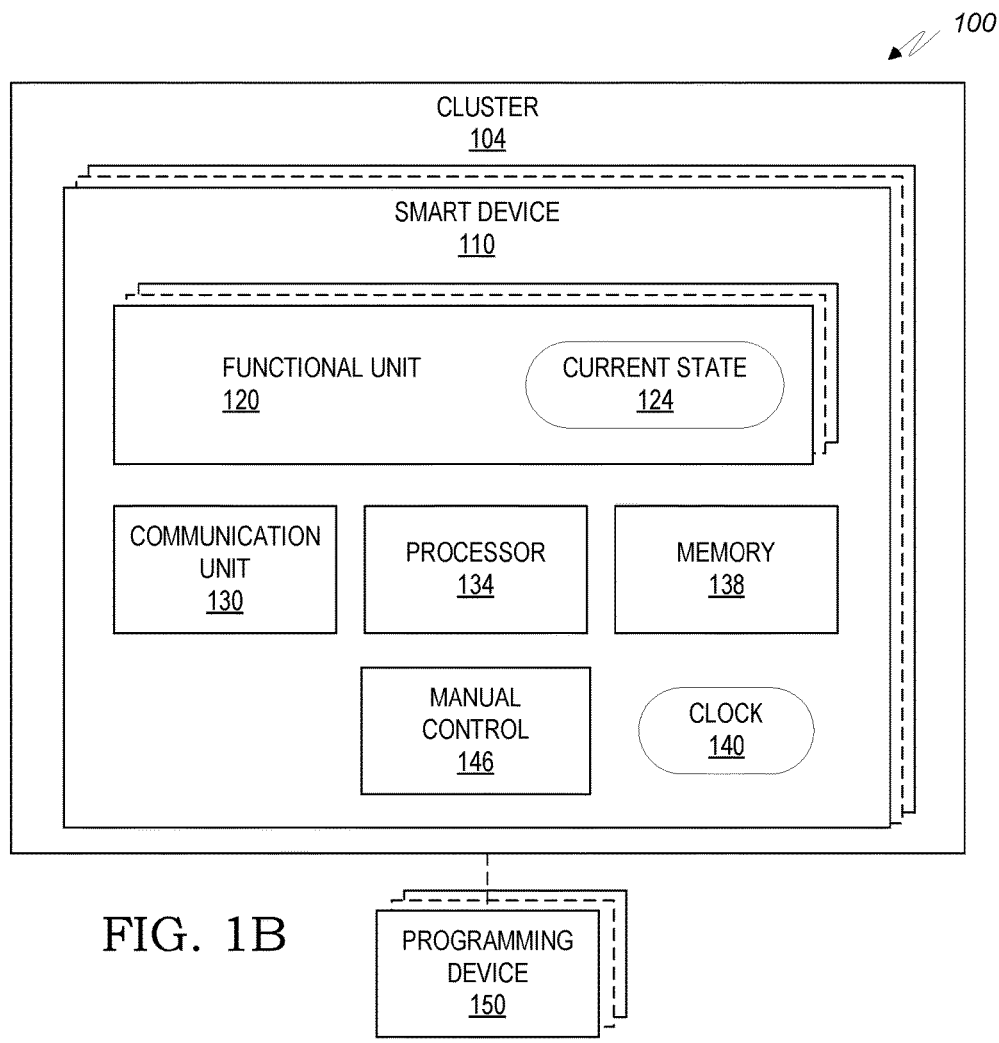

FIG. 1B depicts a system 100 that includes a cluster 104 of smart devices, selectably connectable (i.e. may be connected or disconnected by a user) to one or more programming device 150. Cluster 104 includes a plurality of smart devices 110. Each smart device includes at least one functional unit 120, which serves a purpose and utility of smart device 110, and a communication unit 130 for communicating with other smart devices and with programming device 150. A functional unit 120 is either an active unit or an information unit. An active unit provides a useful service to the user, and its operation is affected by one or more functional units. An information unit may affect the operation of an active unit. Exemplary active units include an air conditioner, lights, alarm, electric shades, electric gate, or a remote control of a multimedia component exhibiting content of interest to a user. Exemplary information units include sensors of temperature, humidity, light intensity, motion, an Internet-connected appliance that fetches data from websites, etc. In the present context, a helpful criterion for distinguishing between an information unit and an active unit is that information units do not require programming by users, while the operation of active units is programmed or may be programmed by users.

A smart device 110 may include several functional units 120; for example, a smart ceiling fan may include a fan unit, a light unit, and a thermometer. If a smart device includes at least one active unit, it is called an active device. For brevity, the functional units of all smart devices that belong to a cluster are collectively referred to as the functional units of the cluster.

Each functional unit has a current state 124 that measures or characterizes the current condition or output of the functional unit. The current state may be registered in a storage device of the functional unit or of the smart device, and is communicated by the smart device via communication unit 130 to other smart devices of the cluster, possibly affecting the operation of active units. In case of an information unit, the current state is typically the information measured, detected or otherwise obtained by the information unit. In case of an active unit, the current state represents the current activity status of the active unit; for example, in case of an active unit that is the living room light, the current state may be 0 (off), 1 (low) or 2 (high).

It will be noted that active units may be affected by current states not only of information units, but, alternatively or additionally, of other active units. For example, an active unit of a fan may turn off in response to an active unit of lights turning off.

Some smart devices may host several functionalities, for example: a ceiling fan that includes both a fan and a light, or a camera that serves as both a motion sensor and license plate reader. Preferably but not necessarily, such smart devices will be considered to include several separate functional units, each having its own state. It will be appreciated, however, that some such devices may alternatively be considered to host a single complex functional unit; for example, a ceiling fan having both a fan unit and a light unit may be considered as including a single complex functional unit of fan+light that has nine states: 00, 01, 02, 10, 11, 12, 20, 21, 22, where the first digit relates to the fan's off, low and high operation modes while the second digit relates to the light's off, low and high intensity modes.

Memory 138 performs general storage functions in cooperation with processor 134. Additionally, in case of an active device, memory 138 also stores code derived from spreadsheet formula(s), or spreadsheet formulas, or a complete spreadsheet as discussed below. Processor 134 controls the operation of functional unit 120 if the unit is an active unit, and the communication with other devices. Optional real-time clock 140, that may form part of processor 134, may be included in smart device 110, to allow recording the time of changes in current state 124 and optionally affect operations of active smart units, for example, prevent loud music playing at night. Manual control 146 is optionally included in some active devices, for allowing manual override by the user over the programming of a certain functional unit; for example, turn on the light in spite of programming that decides otherwise. Such override preferably causes a corresponding change of the current state 124 that is reported to other smart devices of the cluster.

Programming device 150 is used by a user for programming the cluster and other tasks described below. It communicates with smart devices of the cluster, as described below.

Figure 1C:
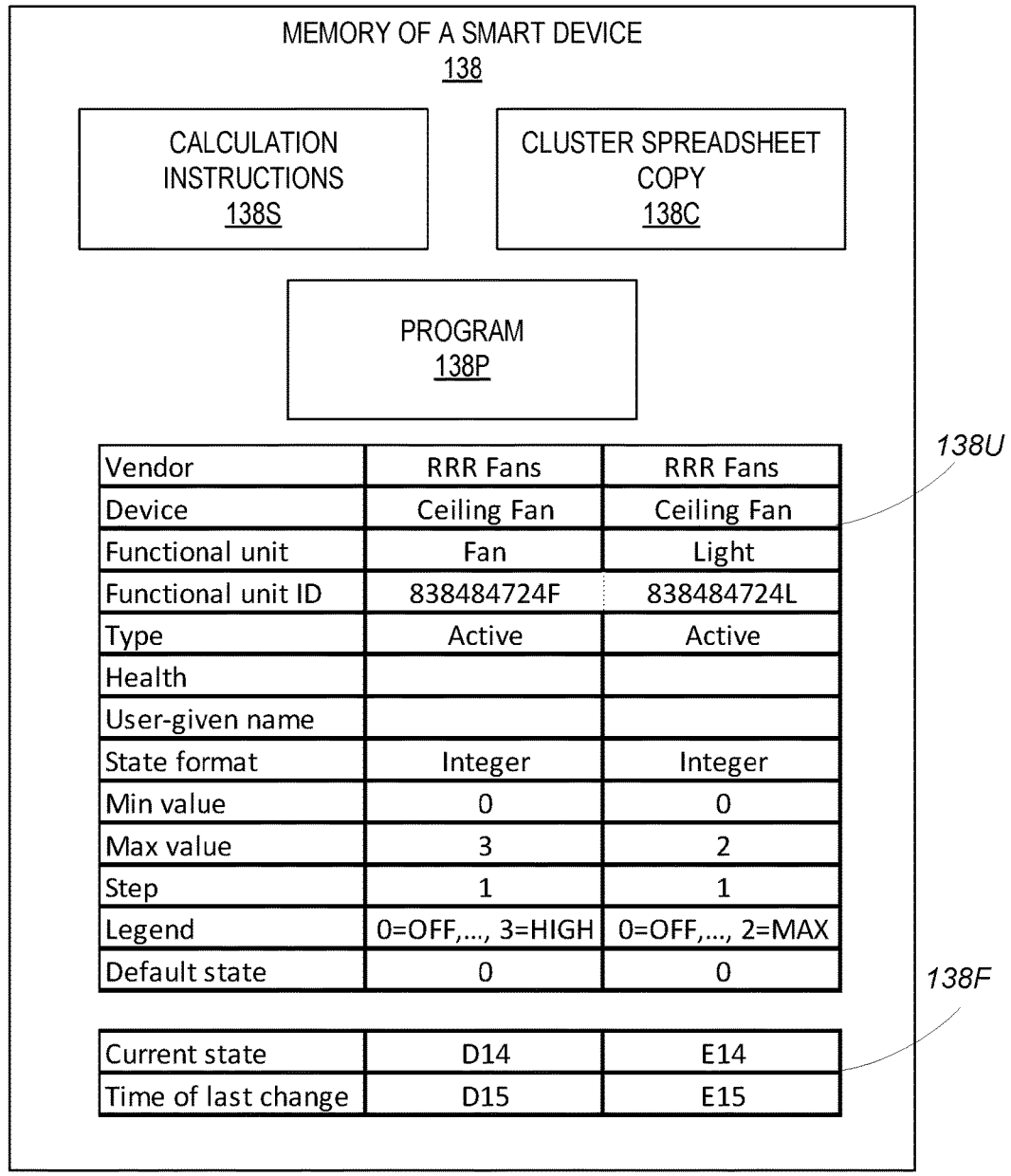
FIG. 1C is a simplified block diagram describing a memory of a smart device.

FIG. 1C demonstrates exemplary contents of memory 138 of FIG. 1B in a preferred embodiment of a smart device 110 of FIG. 1B. Calculation instructions 138S are included in an active device, where they operate processor 134 of the smart device for calculating target state(s) of active unit(s) included in the smart device. Calculation instructions 138S are redundant and may be eliminated in an information device, i.e. in a smart device that includes no active units. Calculation instructions 138S are a complete copy or a portion of a cluster spreadsheet, or a code derived from a spreadsheet, as will be described in more detail below. In case that calculation instructions 138S are not included at all, for example in an information device, or if calculation instructions 138S are less than the complete cluster spreadsheet, then, preferably but not necessarily, memory 138 stores cluster spreadsheet copy 138C, for supporting restoring of the cluster by a programming device, as described below. Program 138P runs on processor 134 of smart device 110 (FIG. 1B) for executing calculation and communication operations; in case of an active device, program 138P interprets calculation instructions 138S for calculating target states and controlling the active unit(s) included in the smart device toward reaching the respective target states; in both active and information devices, program 138P operates to broadcast the current state of the active unit(s) to other smart devices of the cluster. Functional unit table 138U is preferably included in memory 138 and is set by the vendor of smart device 110 (FIG. 1B) to exhibit the characteristics of the functional units included in the smart device, to be used for filling-in operational and guidance information into the cluster spreadsheet via a programming device. Functional unit cells 138F preferably register in memory 138 the column allocated for each functional unit in the cluster spreadsheet, and the specific cells of the cluster spreadsheet allocated for recording the current state and time of its last change, per each functional unit of the smart device. Functional unit cells 138F may simplify the current state messages broadcasted by the smart device into a format such as "D14/2" which indicates that the current state of the fan functional unit of the ceiling fan smart device is now 2, to be easily inserted into cell D14 of all spreadsheets of the cluster.

Figure 2A:
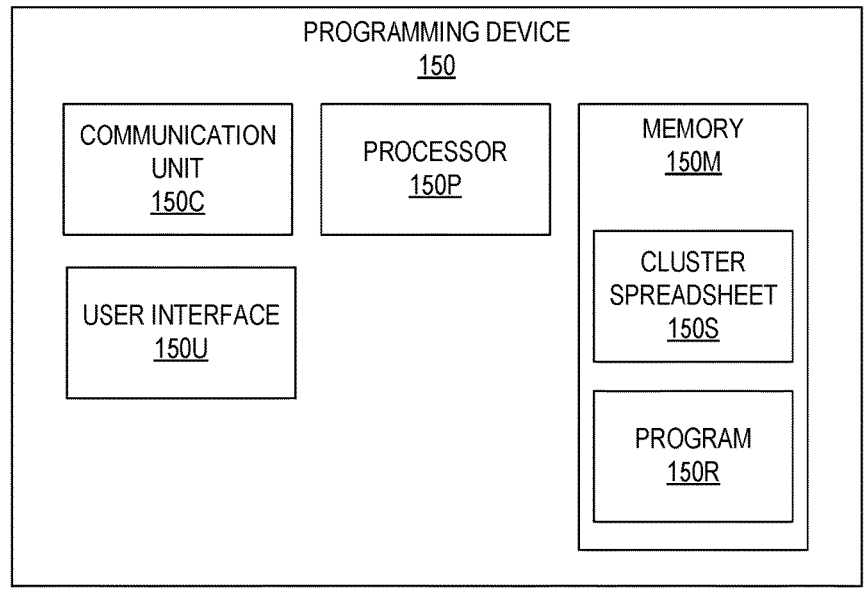
FIG. 2A is a simplified block diagram describing a programming device.

FIG. 2A schematically describes programming device 150 of FIG. 1B. Programming device 150 is a computing device that is used by a user for conveniently programming a cluster; examples for programming device 150 include a desktop or laptop personal computer, a tablet computer or a smartphone. Memory 150M stores program 150R running on processor 150P for establishing, running and updating cluster spreadsheet 150S, authoring programming instructions, and communicating with smart devices of the cluster. Communication unit 150C sends to smart devices of the cluster programming commands derived from cluster spreadsheet 150S, and user interface 150U displays cluster spreadsheet 150S and receives user entries for entering values and formulas into the spreadsheet. It will be noted that preferably the cluster operates autonomously when the programming device 150 is disconnected from the cluster. It will be also noted, that the same or another programming device 150 may be later connected to a cluster for updates or restoring.

Figure 2B:
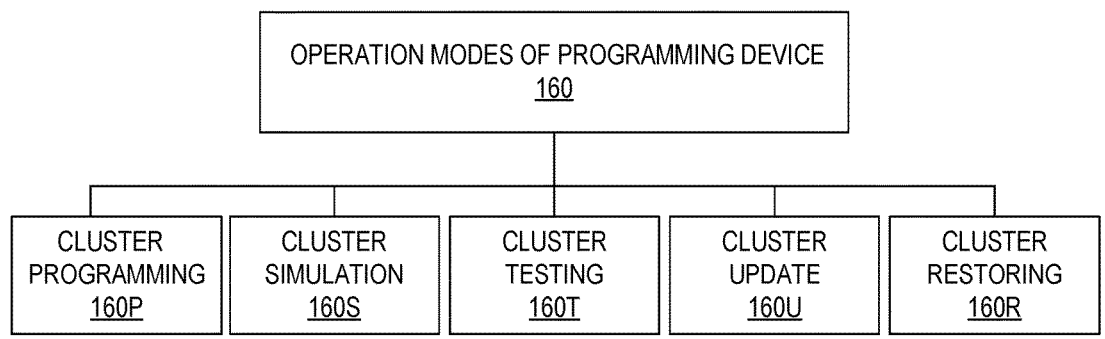
FIG. 2B is a simplified block diagram describing operation modes of a programming device.

FIG. 2B schematically depicts five operation modes 160 of programming device 150 of FIGS. 1B-2A with respect to a cluster. In cluster programming mode 160P a user has designed a cluster of a plurality of smart devices, selected the maker and model of each smart device, and obtained the parameters of each of the smart devices. Thus, for cluster programming mode 160P the user does not need yet to purchase and/or deploy the smart devices, but may obtain the parameters of the smart devices from data sheets or from websites. In this operation mode, the user enters formulas and parameters as further described with reference to FIGS. 3B-3D. During entering formulas, the user gets immediate feedback regarding errors such as in the formula syntax, use of functions, or circular references, and corrects such errors. In cluster simulation mode 160S, which still does not require purchasing and deploying the cluster's smart devices, the user enters various current states and time parameters into the spreadsheet, to simulate a variety of what-if scenarios, which may help in correcting and improving the spreadsheet formulas for better performance of the cluster.

Toward cluster testing mode 160T, the user purchases and deploys the cluster's smart devices, establishes a communication network among all devices of the cluster, and connects the programming device to the cluster so that the programming device can obtain the current states of all functional units of the cluster as reported by all smart devices. The programming device then sends programming commands to all active devices, such as by broadcasting the cluster spreadsheet or a slim version of the cluster spreadsheet to all active devices. The cluster then starts real operation, with all devices performing and cooperating according to their respective columns in the cluster spreadsheet. The user experiences the operation of all active units in the real world, while monitoring all the current states and intermediate calculations shown on the cluster spreadsheet that is displayed by the programming device. The user may then update formulas and parameters on the cluster spreadsheet to correct errors or improve performance and send a fresh set of programming instructions/a fresh copy of the cluster spreadsheet to the cluster's smart devices, and run another round of testing, until he is satisfied, and then may disconnect the programming device from the cluster and leave the cluster for autonomous operation. Cluster testing mode 160T is also useful for revealing functions that work fine on the programming device, yet are not recognized by a leaner spreadsheet interpreter of a smart device.

When the user changes his mind with respect to the way the cluster operates, or adds, deletes or replaces one or more smart devices of the cluster, the programming device is connected to the cluster for running in cluster update mode 160U to update the cluster spreadsheet, which is preferably followed by another round of simulation and testing. Cluster restoring mode 160R is called when the user wishes to test or update the cluster, yet the original programming device or the cluster-related files have been lost. In this case, any compatible programming device 150 is loaded with program 150R, and then connected to the cluster to retrieve the cluster spreadsheet from a smart device of the cluster; in case that calculation instructions 138S (FIG. 1C) are identical to the cluster spreadsheet, then calculation instructions 138S may provide the needed copy, otherwise, cluster spreadsheet copy 138C may be retrieved (cluster spreadsheet copy 138C may be absent if calculation instructions 138S are identical to the cluster spreadsheet.) Upon retrieving the cluster spreadsheet, restoring is completed, and the programming device is ready for cluster simulation, testing and/or update.

Cluster Spreadsheet

The cluster spreadsheet is the tool used by a user for programming a cluster, as well as for simulating and testing the cluster's operation, and updating and restoring a cluster, as described above with reference to FIG. 2B. The cluster spreadsheet is composed and manipulated by a programming device.

FIG. 3A is a simplified segment of an exemplary blank cluster spreadsheet 300A, such as cluster spreadsheet 150S of FIG. 2A. Cells A1-A17 include exemplary generic row titles. Rows 1-16 of each column B and beyond, are dedicated to a specific functional unit of a smart device of the cluster. The contents of ells marked "V" are to be determined by a vendor of the respective smart device. Cells marked "U" are to be filled by the user. "V/U" denotes a default value initially determined by the vendor but can be modified by the user. "U/D" denotes cells to be filled by the user for cluster simulation and later be determined by devices/functional units during testing and actual operation of the cluster. "(U)" denotes formula cells that are to be filled by the user, but typically just for functional units that are active unit. "V/(U)" denotes state formats that are determined by the vendor, but in some cases, may be modifiable by the user; for example, a thermometer may have a Fahrenheit format that the user may be allowed to change to Celsius. A cluster spreadsheet of the type demonstrated by spreadsheet 300A may serve the five roles described with reference to FIG. 2B.

It will be noted that other spreadsheet sizes, arrangements, titles and conventions may be implemented instead of those described in FIGS. 3A-F, as long as they provide a cluster spreadsheet that performs the functionalities described herein.

For clarity, the roles of the rows will be described with reference to a concrete example in FIG. 3B below. As demonstrated by FIG. 3B, row 18 and below (out of which rows 18-25 are shown), as well as optionally also columns to the right of the last functional unit column (not shown) and/or additional worksheets within the workbook (not shown) are usable as a general scratchpad, allowing the user to enter parameters, tables, databases and/or links, and perform intermediate calculations, as spreadsheet users commonly do in order to break down a complex calculation into several simpler calculation steps or for any other calculation purpose.

FIG. 3B schematically describes an exemplary cluster spreadsheet 300B of a basic cluster that includes three smart devices: a light switch (column B), a thermometer (column C), and a ceiling fan that includes two functional units: a fan (column D) and a light (column E).

To fill-in columns B-E, the user, using a programming device, may download module description such as 300C (FIG. 3C) from each respective vendor's website, and copy/paste the module description into the cluster spreadsheet. Alternatively, the same parameters may be keyed-in manually into the programming device according to a product datasheet, or downloaded automatically from an actual smart device upon first connection between the smart device and a programming device. The user is then prompted to name the functional units of the cluster (row 7), consider changing default states (row 13) and program the active units of the cluster by entering formulas calculating target states into row 16 and optionally also using the scratch pad area (such as row 18 and below) for intermediate calculations. It will be noted that since the exemplary functional units of columns B and C are information units (see row 5), row 16 does not expect formulas in columns B and C.

The rows of a cluster spreadsheet are described herein, using spreadsheet 300B of FIG. 3B as an example. (1) Vendor row is set by the vendor and includes the name of a vendor (usually—manufacturer) of a smart device, to help the user identify the respective device. (2) Device row is set by the vendor and includes the name of the device. (3) Functional unit row is set by the vendor and includes the name of the functional unit, which is often the same as the smart device—if the smart device includes only one functional unit—or has a distinctive name in case of multiple functional units within a smart device, as demonstrated by columns D-E. (4) Functional unit ID is set by the vendor and includes a unique alphanumeric string that identifies specific devices, and is added when specific hardware is recognized by a programming device upon installation and setup, which allows the user to identify specific devices (having the ID marked on the device and its packaging) in case of multiple similar units within the cluster (for example, several thermometers). The functional unit ID also allows a present disclosure associate column letter (e.g. B for the light switch) with the respective unit. Examples for functional unit ID are shown in FIG. 3D. (5) Type is set by the vendor and comes to distinguish between active units and information units. (6) Health is reported by the smart device, and is included in devices that have a self-test feature, where OK, for example, indicates a healthy functional unit, BAD indicates a malfunctioning functional unit which may turn current state into its default state value (rows 14-15), while other text values may be used by the smart device's vendor as messages to the user (for example: LOW BATTERY) to be displayed in testing mode (160T of FIG. 2B). (7) User-given name is entered by the user via a programming device to identify the specific role of a specific functional unit, such as living room switch. (8) State format is set by the vendor and pertains to the way the current state (and also target state for active units) is expressed, such as integer, text, Boolean, etc. It may also indicate measurement units used, and allow the user to select such units, for example Fahrenheit or Celsius (see column C). In case of integer values, rows (9-11), set by the vendor, define the range pf allowed values. (12) Legend is set by the vendor and identifies the meaning of values. (13) Default state is assumed as the current state of a functional unit, in case that the current state is not received, or the functional unit is in BAD health; the default state is originally suggested by the vendor but may be further set by the user; for example, the vendor may suggest that the default state of a light is off while the user may prefer to set it on. (14) Current state is reported by a smart device, and is the current condition or output of a functional unit, such as a fan operating in high mode or a thermometer measuring 65 degrees Fahrenheit. For active units, the current state may be either measured by an internal sensor, or presumed to equal the target state, for example in case of a light unit, or presumed to reach the target state after a predetermined period of time, for example, an air conditioner may be presumed to reach a current state of high 60 seconds after its target state is changed to high. (15) Time of last change in the current state is reported by the smart device along with reporting the current state. (16) Target state calc is a spreadsheet formula entered by the user, for each active unit (columns D-E in the present example) via a programming device, and typically refers to current states of other functional units, and possibly also to times of last change and intermediate formulas included in the scratch pad are (e.g. rows 18 and below). (17) Current time is the actual time derived from a real-time clock of a device running the spreadsheet, and is potentially taken into account by formulas within the spreadsheet.

FIG. 3D demonstrates spreadsheet 300D in programming and simulation modes, where the user has filled in functional unit names in row 7, optionally has updated default states in row 13, and has entered spreadsheet formulas into row 16 for the active devices of columns D and E. The user has also used the scratchpad area under row 18 to enter spreadsheet formulas for intermediate calculations and parameters that are used for calculations, as users of spreadsheets regularly do. In the scenario of FIG. 3D, the programming device is used to establish and program a cluster prior to connecting to the cluster smart devices, or even prior to purchasing the devices; accordingly, the true current state (row 14) and the time of last change (row 15) are unavailable and the current time (cell B17) is irrelevant. For simulating the cluster operation, the user is advised to experiment with entering various values into rows 14, 15 and 17 and observe the calculated results in all cells that include formulas (in the current example: D16, E16, B19 and B20).

FIG. 3E shows spreadsheet 300E that visually demonstrates what the user actually sees, during simulation modes with the data entered in FIG. 3D, and specifically the calculated results show in the formula cells of FIG. 3D, i.e. in cells D16, E16, B19 and B20. According to the present example, the current hour is calculated by cell B19 as 11, the respective light level is calculated by cell B20 as 1, the light unit of column E is set to target state 1 (cell E16) while the fan unit of column D is set to target state 2 (cell D16).

FIG. 3F illustrates cluster spreadsheet 300F in testing mode, where actual smart devices have been purchased, deployed and are communicating with the programming device that is used for testing (see cluster testing mode 160T in FIG. 2B). The IDs of all actual functional units are displayed in row 4, and all current states and the time of their last changes are shown in rows 14-15, based on actual values received from the respective smart devices, and may be interpreted by the processors of smart devices of the exemplary cluster for operation.

Device Programming

As described above, a cluster is established and programmed by a user using a programming device, and then preferably the cluster continues autonomous operation independently of the programming device. For autonomous operation, every active device is individually programmed to receive from other smart devices the current states of their functional unit(s) and respective time stamps, and calculate, for each of its active units, the target state based on the spreadsheet formula entered by the user into row 16 of the active unit's respective column within the cluster spreadsheet (see, for example, cells D16 and E16 in spreadsheet 300D of FIG. 3D), that possibly references other spreadsheet formulas and parameters entered by the user into the cluster spreadsheet's scratchpad area (see, for example, cells B19-B20 and B22-B23 in spreadsheet 300D). For autonomously performing such operations, each active device is programmed by the programming device toward operation and/or testing (cluster testing mode 160T in FIG. 2B).

Programming of an active device of a cluster by a programming device is made via a programming message including instructions for calculating a target state of an active unit of the active device according to one or more spreadsheet formula(s). Such a message can have various forms, as discussed with reference to FIG. 4 below.

In one embodiment, the programming message sent by the programming device is of a device spreadsheet that is a copy of cluster spreadsheet 300F of FIG. 3F. The processor of the active device receiving such a message is programmed to interpret the spreadsheet and is aware of the spreadsheet column(s) allocated for the active unit(s) included in the smart device. Thus, the active device's processor interprets the device spreadsheet (which is the same as the cluster spreadsheet) to calculate the target state(s) of its active unit(s), and then controls the active unit(s) for reaching the respective calculated target states.

In another embodiment of device spreadsheet 300G of FIG. 3G, since smart devices do not benefit from human-oriented formatting, the programming message received by a smart device from a programming device may include a plain text version of the cluster spreadsheet, such as spreadsheet 300G of FIG. 3G, that is a CSV (comma separated values) version of cluster spreadsheet 300F.

Spreadsheet 300H of FIG. 3H demonstrates a device spreadsheet in CSV format that is a transpose of spreadsheet 300G of FIG. 3G. Thus, both cluster spreadsheets and device spreadsheets may allocate a row per active unit, rather than allocating a column per active unit in the other exemplary spreadsheets. Thus, the spreadsheet representation of a cluster taught by the present disclosure is not limited to allocating a column per active unit.

Since smart devices do not benefit from contents used for user guidance, the guidance cells from cluster spreadsheet 300F of FIG. 3F may be cleared, leaving a programming message including a slim CSV-format device spreadsheet as demonstrated by device spreadsheet 300J of FIG. 3J. It will be noted that the formulas and parameters in the scratchpad area need to be included in the slim spreadsheet if they are referenced, directly or indirectly, by the target state cells of the active units included in the active device. In case of larger clusters that include several active devices, the device spreadsheet may be further trimmed per active device by removing cells that are not affecting the target state(s) of the active unit(s) of the current active device.

Essentially, the spreadsheets of FIGS. 3F-3H and 3J have the same effect on the smart devices that interpret them for operation. The advantage of spreadsheet 300F of FIG. 3F is, however, the uniformity of the spreadsheet across all active devices of the cluster as well as the programming device(s). Such uniformity implies that all active devices of the cluster include the cluster spreadsheet, which allows any compatible programming device, even if it is unfamiliar with the cluster, to get immediately acquainted with the cluster and start full operation upon first communication with any active device of the cluster. This advantage shall be further appreciated by recognizing that actual clusters may operate for years before requiring update, upgrade or maintenance, and any programming device that was originally involved in the initial setup of the cluster may have retired or been lost (see cluster restoring mode 160R of FIG. 2B). If, however, for engineering or other considerations, the programming of the smart device is made by less than the cluster spreadsheet, then advantageously a complete copy of the cluster spreadsheet may be copied during cluster programming, for cluster restoring purpose, to devices of the cluster (see cluster spreadsheet copy 138C in FIG. 1C).

The inclusion of a copy of the cluster spreadsheet in information devices is optional, for cluster-level redundancy. Otherwise, an information device does not need a spreadsheet for its operation within the teachings of the present disclosure.

Figure 4:
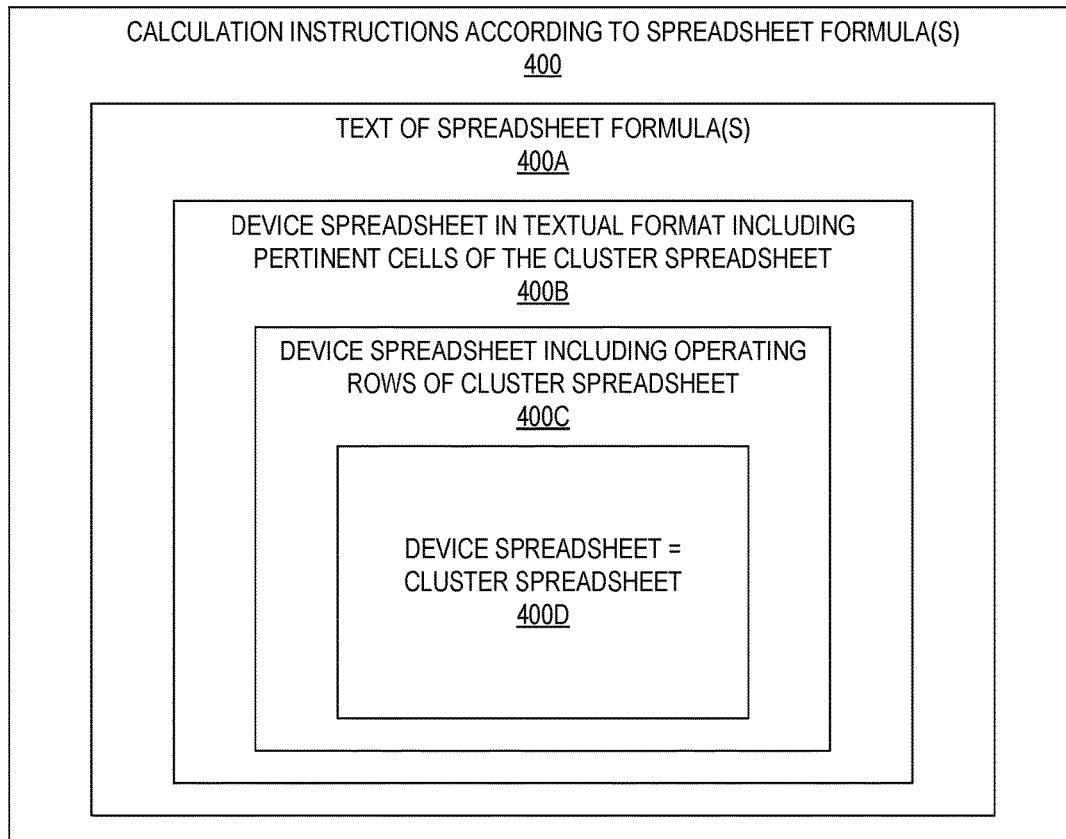
FIG. 4 is a diagram presenting various possibilities for the content of programming messages sent from a programming device to a smart device.

FIG. 4 schematically summarizes various possibilities for the content of a programming message sent by a programming device to an active device during setup or update of a cluster. Essentially, the basis for programming an active device is spreadsheet formulas included in the cluster spreadsheet, such as spreadsheet 300D of FIG. 3D, that possibly references other spreadsheet formulas in the scratchpad area of the spreadsheet. By compilation of the spreadsheet with focus on calculating the target state of a selected active unit, code may be generated by the programming device for running on the processor of the respective active device, for operating the selected active unit, hence the broad expression "calculation instructions according to spreadsheet formula(s)" 400 of FIG. 4. A more specific embodiment is that of "text of spreadsheet formula(s)" 400A, where the programming message sent from the programming device to an active device includes text of actual spreadsheet formulas such as IF(E14=0,0,(IF(C12<=68,0,(IF(C12<=75,1,(IF(C12<=80,2,3))))))). This embodiment allows each programming message to include merely formulas and references relevant to the selected active device, thus different active devices may receive and store different programming messages. Embodiment 400B is similar to 400A, except that the formulas and cells are organized in a format of a textual device spreadsheet (such as in CSV or tab-delimited text format) derived from the cluster spreadsheet, hence the respective active device's processor is programmed to interpret data and formulas organized as a spreadsheet. Embodiment 400C pertains to exemplary spreadsheet 300H of FIG. 3H, where all active devices of the cluster store the same, partial version of the cluster spreadsheet, in formats such as XLSX, CSV or TXT; while embodiment 400D pertains to exemplary spreadsheet 300F of FIG. 3F, where the device spreadsheet=cluster spreadsheet. It will be noted that embodiments 400B-400D require the processors of the active devices of the cluster being programmed for interpreting spreadsheets.

With reference to the exemplary embodiments of FIGS. 3F-3H, it shall be noted that when the smart device programming is made via a complete or partial cluster spreadsheet, each smart device shall preferably but not necessarily be aware of the spreadsheet column dedicated to each functional unit included in the smart device, such that: (i) messages reporting health or current state and the time of its last change (rows 6, 14-15) are sent by smart devices in association with the corresponding column(s) of the included functional unit(s), and (ii) each active device retrieves the target state(s) of its active unit(s) from the result in row 16 of the column(s) corresponding to each active unit. Alternatively, functional units may be identified, when sending and interpreting health, current states and times of last change update messages, by their functional unit ID (row 4 in the exemplary spreadsheets) being attached to each message.

Embodiment 400D/300F, where all active devices of a cluster store the cluster spreadsheet, that is ready to run on a programming device and interact with a user, offers many advantages of simplicity, reliability, cluster maintenance, the ability to broadcast a single programming message to all smart devices of the cluster, and straightforward restoring of a cluster by a programming device retrieving the cluster spreadsheet from any active device of the cluster. However, FIG. 4 demonstrates that there are also other viable possibilities that may work, under the broad definition of calculation instructions according to spreadsheet formula(s), which may work better for some processors of smart devices with limited storage and processing capacity.

Cluster Programming Process

Figure 5A:
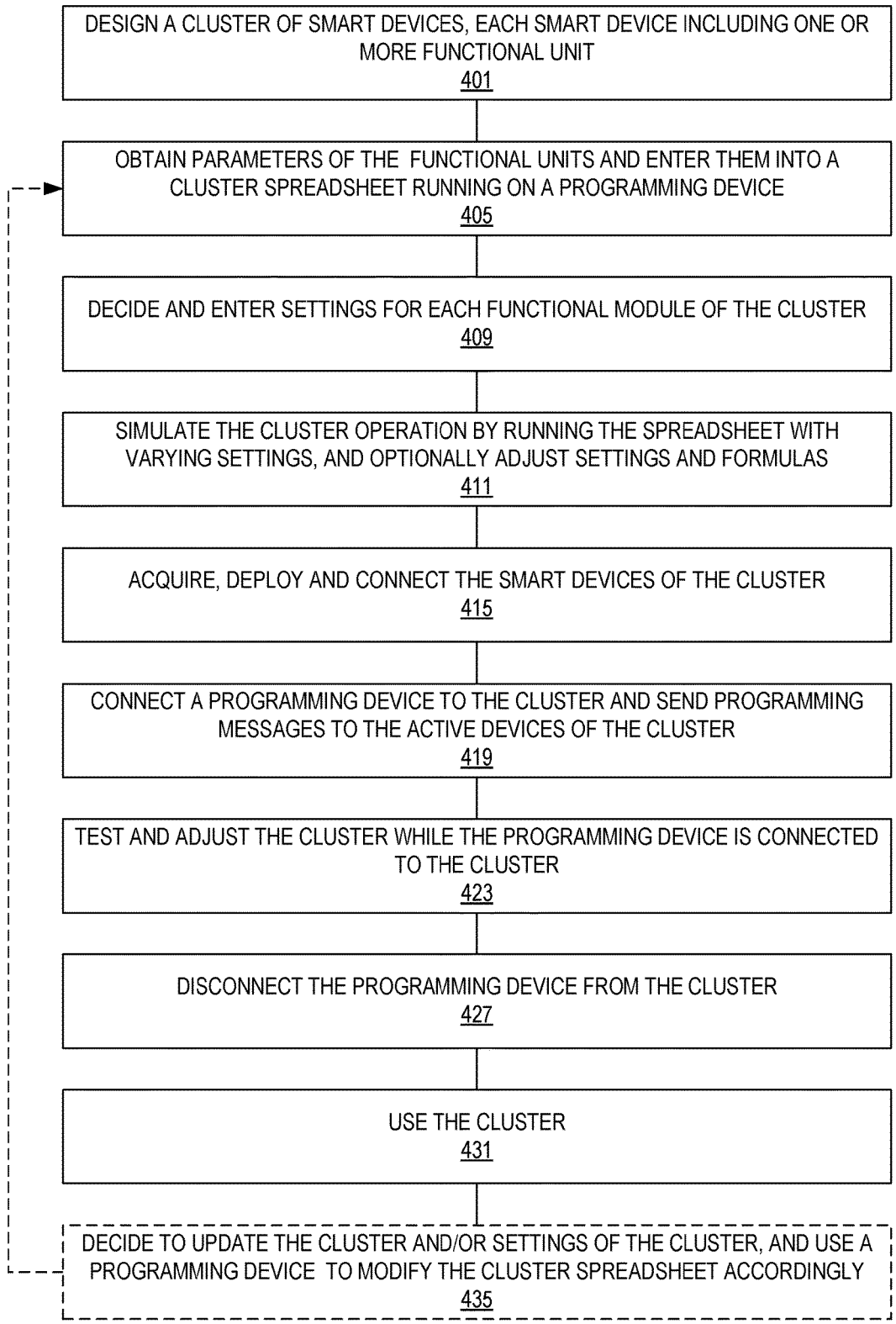
FIG. 5A is a flowchart describing an exemplary process of programming a cluster.

FIG. 5A schematically depicts programming of a cluster of smart devices by a user. In step 401, the user designs a cluster of smart devices that he/she wants to acquire, deploy and use, each smart device including one or more functional unit(s). In step 405, the user uses a programming device, for example a laptop computer, for establishing a cluster spreadsheet including the smart devices of the cluster, as demonstrated, for example, by spreadsheet 300B of FIG. 3B, where parameters of individual modules, for example module description 300C of FIG. 3C, are obtained via the internet, from datasheets, or from the respective smart devices. In step 409, the user decides and enters into the cluster spreadsheet settings for each functional unit of the cluster, including formulas for calculating target states for active devices, as demonstrated, for example, by spreadsheet 300D of FIG. 3D. In step 411, the user simulates the cluster (cluster simulation mode 160S of FIG. 2B) by running the cluster spreadsheet with varying settings, until he/she is satisfied with the operation of the simulated cluster. In step 415, the user acquires and deploys the smart devices of the cluster and connects them to a cluster network so that each smart device of the cluster can communicate with each other smart device of the cluster, for example via a Wi-Fi or BLE (Bluetooth low energy) network. In step 419, a programming device, that can be the same programming device used in step 405 or another programming device loaded with the cluster spreadsheet, is connected to the cluster and sends programming messages to all active devices of the cluster, each programming message is for calculating a target state of an active unit according to the respective formula cells of the cluster spreadsheet. The programming message may be in any of the forms summarized in FIG. 4. In step 423 the user tests the cluster (luster testing mode 160T of FIG. 2B) by observing the operation of all active devices in the real world while monitoring, on the screen of the programming device, the current states of all devices, as well as the results of intermediate calculations. The user may adjust formulas and parameters to correct errors and improve performance. In step 427 the programming device is preferably disconnected from the cluster, leaving the cluster to autonomously operate in step 431, which may last for days, months or years. In optional step 435, the user decides to repair, add, remove or replace smart devices of the cluster, or just improve performance, and then uses a programming device for such reprogramming, starting again from step 405. It will be appreciated that in step 435, the user may use a programming device that is unacquainted with the present cluster, and connect with any active device of the cluster to retrieve the cluster spreadsheet (cluster restoring mode 160R of FIG. 2B).

Figure 5B:
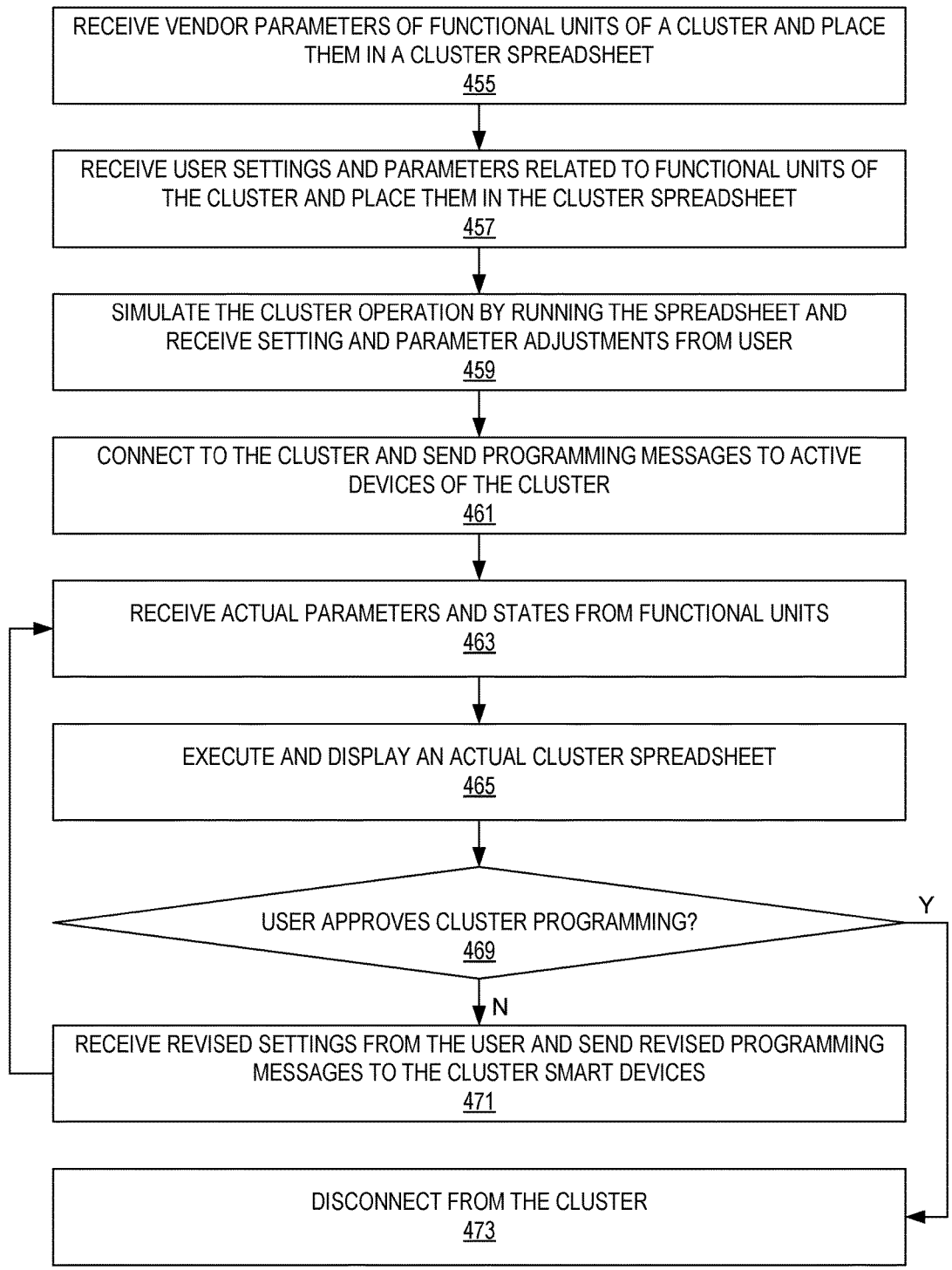
FIG. 5B is a flowchart describing an exemplary process of operating a programming device.

FIG. 5B schematically depicts the operation of a programming device, such as programming device 150 of FIGS. 1B and 2A. In step 455, the programming device establishes a cluster spreadsheet and receives general vendor parameters for all functional units included in the cluster, as demonstrated, for example, by spreadsheet 300B of FIG. 3B. Such vendor parameters are entered by the user or, in some embodiments, may be read from smart devices when connected to the programming device. In step 457, the programming device receives from the user settings (including formulas) and parameters related to functional units of the cluster, and places them in the cluster spreadsheet, as demonstrated, for example, by spreadsheet 300D of FIG. 3D. In step 459, the programming device simulates the cluster (cluster simulation mode 160S of FIG. 2B) by running the cluster spreadsheet, allowing the user to enter varying parameters and settings and view the calculated results, as demonstrated, for example, by spreadsheet 300E of FIG. 3E. In step 461, the programming device is connected to the cluster, and then sends programming messages to all active units of the cluster, for example, by broadcasting the cluster spreadsheet to all active devices, or by sending a customized device spreadsheet to each active device. In step 463, while still connected to the cluster, actual current status parameters from all functional units of the cluster are received and in step 465 the received parameters are displayed, along with calculation results, so the user actually runs a live test of the cluster (see cluster simulation mode 160S of FIG. 2B). In step 469 the programming device receives from the user an indication whether the user approves the cluster programming, in which case, in step 473 the programming device is disconnected from the cluster and the cluster is left to operate autonomously. Alternatively, in step 471 the programming device receives revised settings from the user, sends updated programming messages to the smart devices, and diverts to step 463 for another round of live testing.

Figure 5C:
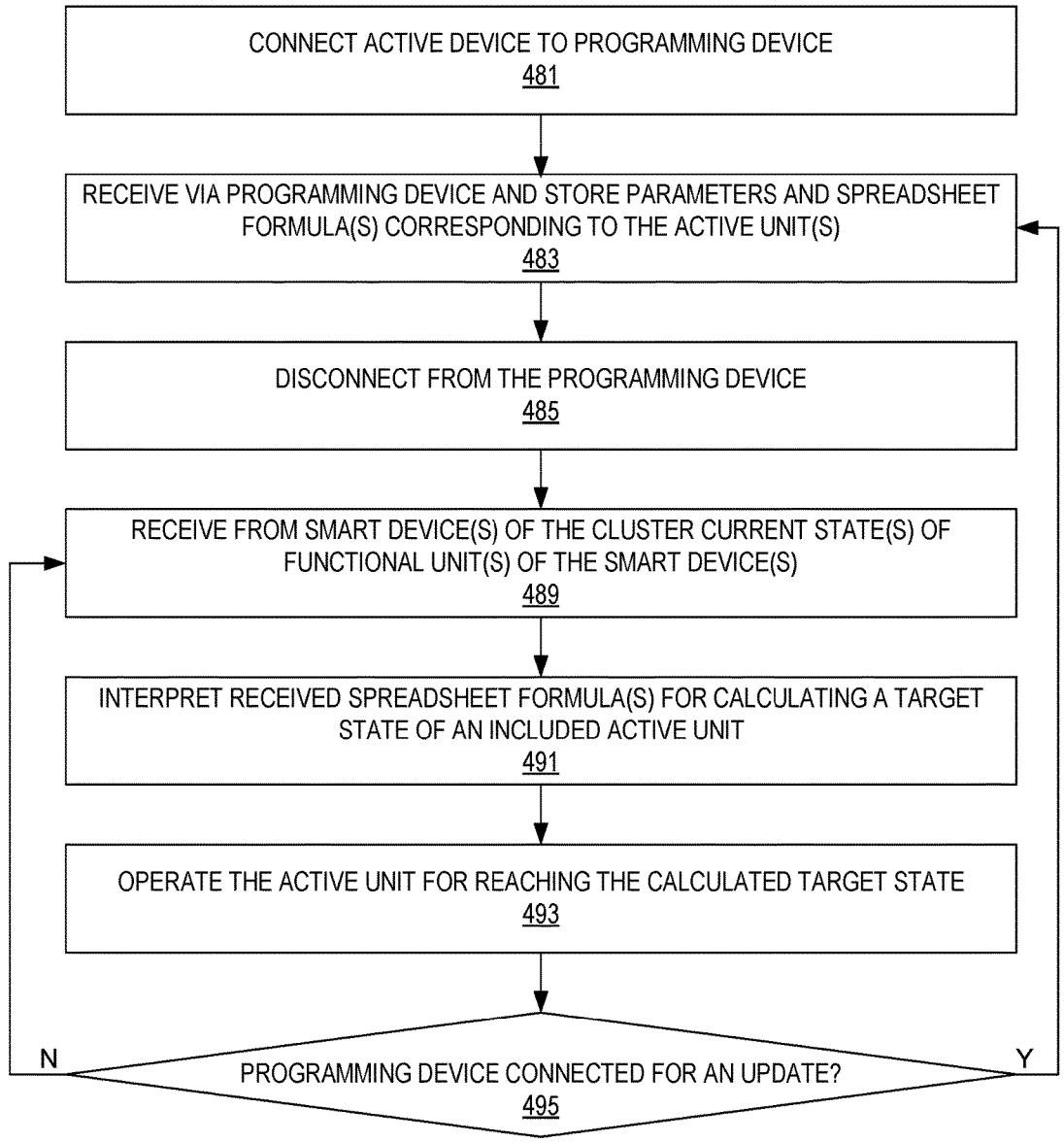
FIG. 5C is a flowchart describing an exemplary process of operating a processor of a programming device.

FIG. 5C depicts the operation of a processor of an active device. In step 481 the active device connects to a programming device via the cluster network. In step 483, the active device receives from the user, via the programming device, parameters and spreadsheet formula(s) that the user has entered into the programming device, and in step 485 the programmed active device is disconnected from the programming device. In step 489, the active device receives current states of functional unit(s) from other smart device(s) of the cluster, and in step 491, the active device interprets the spreadsheet formula(s) received in step 483, to calculate a target state of an active unit of the active device. If the target state is different than the current state of the active unit, then in step 493 the processor operates the active unit for reaching the calculated target state. If in step 495 the active device is reconnected to a programming device for updating the programming, then the process diverts to step 483 for another round of programming, otherwise the process diverts to step 489, waiting for changes in current states of other devices to trigger a change of state of an active unit of the active device.

Figure 6:
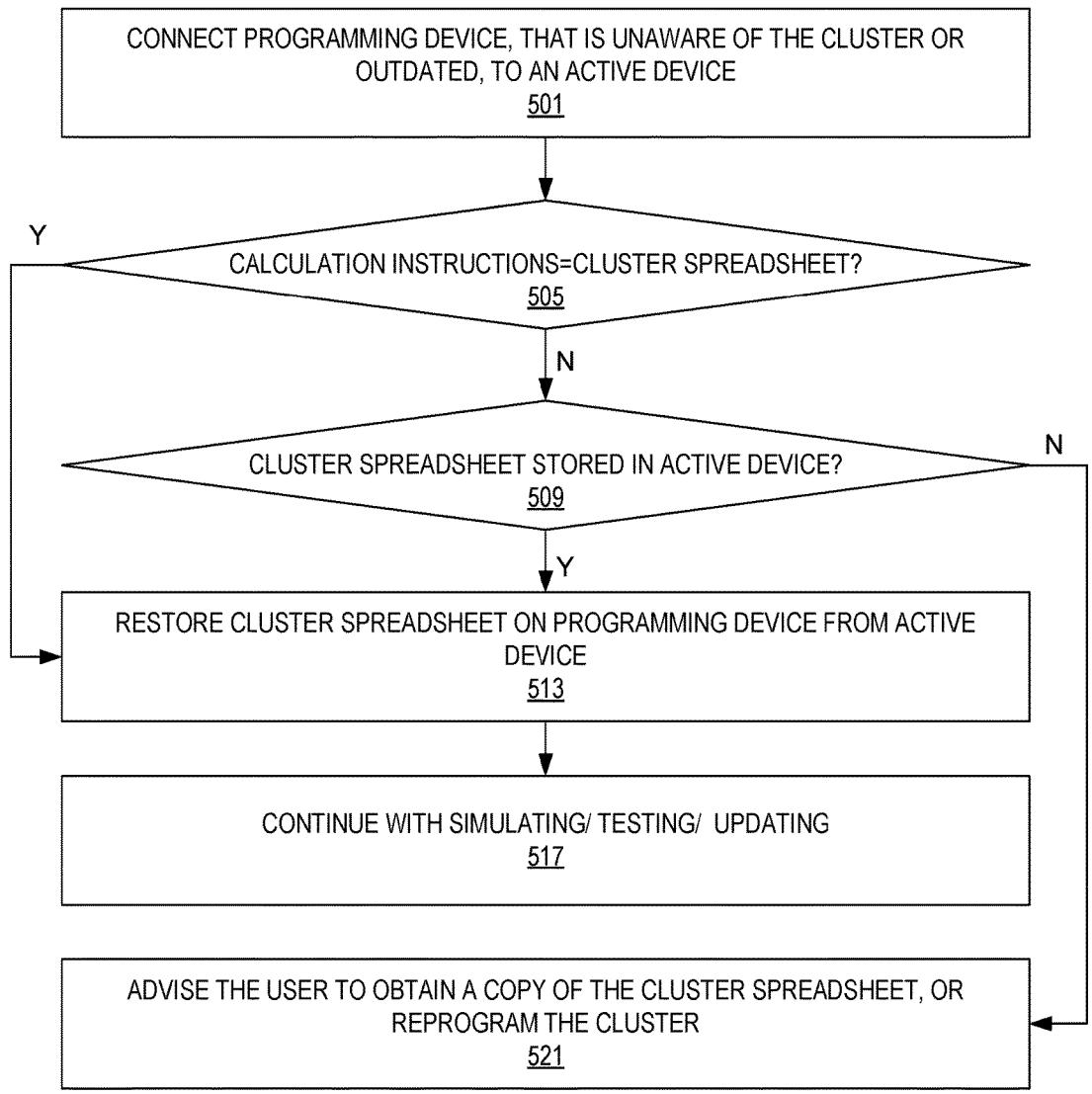
FIG. 6 is a flowchart describing an exemplary process of restoring a cluster spreadsheet from the memory of an active device.

FIG. 6 schematically depicts cluster restoring mode 160R of FIG. 2B. In step 501, a programming device that is unaware of a cluster or outdated, for example as in the case that another programming device was used for updating a cluster, is connected to an active device of the cluster. With reference also to FIG. 1C, step 505 checks whether, according to the cluster configuration parameters (not shown), calculation instructions 138S stored in the memory of the active device are in the form of a copy of the cluster spreadsheet, and, if so, the process continues with step 513 of restoring the cluster spreadsheet on the programming device from the programming instructions on the active device. If the step 505 test fails, then step 509 checks the availability of a copy of the cluster spreadsheet in cluster spreadsheet copy 138C in the memory of the active device, in which case the process continues with step 513 of restoring the cluster spreadsheet on the programming device from the cluster spreadsheet copy 138C on the active device. In step 517, the programming device continues with any of cluster simulation mode 160S, cluster testing mode 160T or cluster update mode 160U. If both tests 505 and 509 fail, then the user is advised in step 521 to obtain a cluster spreadsheet copy from another source, or reprogram the cluster from scratch.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. A user-programmable system comprising:
   a cluster of a plurality of smart devices, each smart device including:
      at least one functional unit, each functional unit having a current state of the functional unit, and
      a communication unit for communicating with other devices and for sending to other smart devices of the cluster updates on the current state of each functional unit of the smart device,
      wherein at least two of the plurality of smart devices are active devices, each active device including a functional unit that is an active unit that performs an action, each active unit having a target state of the active unit; and
   a user-operable programming device including:
      a communication unit for selectably communicating with smart devices of the cluster,
      a memory for storing a cluster spreadsheet, the cluster spreadsheet including: (i) a plurality of current state cells, each current state cell corresponding to a functional unit of the cluster and is for storing a current state of the functional unit, and (ii) for each active unit of the cluster: a formula cell for storing a spreadsheet formula authored by a user for calculating the target state of the active unit according to one or more cells of the cluster spreadsheet,
      a user interface for enabling viewing and modifying the cluster spreadsheet by users, and
      a processor programmed to: (i) run a spreadsheet program for receiving from a user, via the user interface, spreadsheet formulas for formula cells, and (ii) send a programming message to each active device of the cluster, the programming message including instructions for calculating, by a processor of the active device, the target state of an active unit included in the active device, according to the spreadsheet formula corresponding to the active unit;
   wherein, for autonomous operation of the cluster after the programming device is disconnected from the cluster, each active device of the cluster, that includes an active unit, further including:
      a memory of the active device, and
      a processor programmed to: (i) receive a programming message from a programming device, the programming message including instructions for calculating a target state of the active unit according to one or more spreadsheet formulas, (ii) store instructions from the programming message in the memory of the active device, (iii) receive one or more current states of one or more functional units of the cluster, (iv) execute instructions from the programming message stored in the memory of the active device for calculating the target state of the active unit according to one or more received current states, and (v) control the active unit for reaching the calculated target state.

2. The user-programmable system of claim 1, wherein the processor of the programming device is further programmed to run the spreadsheet program in a cluster simulation mode, which includes: receiving from the user, via the user interface, user-selected values for current state cells, calculating target states, and displaying the calculated target states.

3. The user-programmable system of claim 1, wherein, for each active device:
   a programming message received by the active device from the programming device includes text from at least one spreadsheet formula authored by a user; and
   the processor of the active device is programmed to interpret text of spreadsheet formulas to calculate target states according to the interpreted text.

4. The user-programmable system of claim 1, wherein, for each active device:
   the programming message received by the processor of the active device from the processor of the programming device is in a form of a device spreadsheet that includes all or part of the cluster spreadsheet;
   the current states received by the processor of the active device are entered by the processor of the active device into corresponding cells of the device spreadsheet; and
   the calculating the target state is done by the processor of the active device interpreting the device spreadsheet.

5. The user-programmable system of claim 4, wherein each device spreadsheet received from the processor of the programming device is in textual format.

6. The user-programmable system of claim 1, wherein:
   the cluster includes at least one smart device that include a real-time clock; and
   at least one spreadsheet formula includes a time parameter.

7. The user-programmable system of claim 1, wherein:
   the cluster spreadsheet includes a scratchpad area that includes one or more spreadsheet formulas authored by a user for performing intermediate calculations; and
   the calculating a target state by the processor of at least one active device is affected by the intermediate calculations.

8. A method of operation of a cluster of a plurality of smart devices, the cluster including at least two active devices each including an active unit, the method comprising:
   in each active device of the at least two active devices:
      receiving from a user, via a programming device, at least one spreadsheet formula corresponding to the active unit included in the active device, and storing the at least one spreadsheet formula in a memory of the active device; and in each active device of the at least two active devices: (i) receiving from each of at least one other smart device of the cluster, a current state of at least one functional unit included in the respective other smart device; (ii) autonomously, after the programming device is disconnected from the cluster, interpreting the at least one spreadsheet formula stored in the memory of the active device for calculating a target state of the active unit according to at least one received current state of a functional unit; and (iii) operating the active unit for reaching the calculated target state.

9. The method of claim 8, wherein the at least one spreadsheet formula includes a formula for an intermediate calculation.

10. The method of claim 8, wherein:

an active device includes a real-time clock; and at least one spreadsheet formula includes a time parameter.

11. A cluster of a plurality of smart devices, the cluster comprising at least two active devices, each active device of the at least two active devices including:

an active unit;

a memory for storing at least one spreadsheet formula corresponding to the active unit and received from a user via a programming device;

a communication unit for receiving, from each of at least one other smart device of the cluster, a current state of at least one functional unit included in the respective other smart device; and a processor programmed to: (i) autonomously, after the programming device is disconnected from the cluster, interpret the at least one spreadsheet formula stored in the memory for calculating a target state of the active unit according to at least one received current state of a functional unit, and (ii) operate the active unit for reaching the calculated target state.

12. The cluster of claim 11, wherein at least one active device also including an information unit.

13. The cluster of claim 11, wherein the memory of an active device stores a formula for an intermediate calculation.

14. The cluster of claim 11, wherein at least one device of the cluster includes a real-time clock, and the at least one spreadsheet formula includes a time parameter.

15. The cluster of claim 11, wherein:

each of the at least one spreadsheet formula stored in the memory of an active unit forms part of a device spreadsheet; and all device spreadsheets of all active units of the cluster include the same spreadsheet formulas.

* * * * *